United States Patent Office 3,211,718
Patented Oct. 12, 1965

3,211,718
AZO DYES AND INTERMEDIATES THEREFOR
Norbert M. Bikales, Livingston, N.J., assignor to American Cyanamid Company, Stamford, Conn., a corporation of Maine
No Drawing. Filed Dec. 10, 1962, Ser. No. 243,614
6 Claims. (Cl. 260—197)

This invention relates to, and has as its object, the provision of new compounds and azo dyes prepared therefrom. More specifically, it relates to the provision of 3-(o-aminophenylthio)propionitriles and azo dyestuffs wherein the aforementioned compounds are the diazo components.

The new compounds of this invention are represented by the following formula:

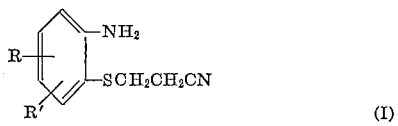
(I)

wherein R and R' are each either hydrogen, lower alkyl (e.g., alkyl of from 1 to 7 carbon atoms, such as, methyl, ethyl and hexyl), halo (e.g., chloro and bromo) or nitro. This invention also encompasses salts of the compounds of Formula I with inorganic acids, especially the strong acids, e.g., HCl, H₂SO₄ or HNO₃; or organic acids, e.g., p-toluene sulfonic acid, acetic acid, oxalic acid, etc.

Compounds of the foregoing formula are prepared by the reaction of acrylonitrile and a compound of the formula:

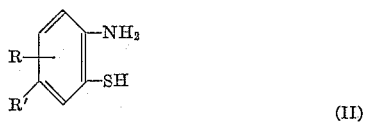
(II)

wherein R and R' are as hereinbefore defined. The reaction is exothermic and may be initiated on simply mixing the reactants at room temperature. Proportions of the two reactants are not critical, and an excess of either may be used. Reaction may be conducted without a diluent, or one may be employed if desired. It may be an organic solvent; or an acidic solvent, such as acetic acid, hydrochloric acid, etc., in which case the product can be isolated as the acid salt in crystalline form.

It is surprising that the reaction of acrylonitrile and the o-mercaptoaniline derivative proceeds as it does. It would be expected that cyanoethylation would occur on the amino radical, rather than on the mercapto radical, or on both radicals when a molar excess of acrylonitrile is employed. It has been found, however, that cyanoethylation is substantially limited to the mercapto radical. Even when the reaction is conducted in the presence of cupric acetate, a known catalyst for cyanoethylation of aromatic amino compounds, only the compound of Formula I is obtained.

Compounds of Formula I are useful as intermediates for the preparation of azo dyestuffs, especially those which may be represented by the following formula:

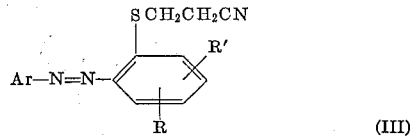
(III)

wherein R and R' are as hereinbefore defined and Ar is the residue of a coupling compound. Such coupling compounds are known, the most available being naphthols (α or β), phenols, anilines or naphthylamines (α- or β-) which may have sulfo, carboxy, nitro, halogen or alkyl substituents. In general, aryl radicals of less than three 6-membered rings, having either an amino or an hydroxyl group and up to about two substituents such as SO₃H (or an equivalent salt), alkyl of from 1 to 7 carbon atoms, nitro, chloro or bromo are preferred. The amino group may be primary, secondary or tertiary, including, for example, lower alkylamino, di(lower)alkyl amino or N-phenyl-N-lower alkylamino-radicals.

Dyestuffs of Formula III may be prepared by diazotizing a compound of Formula I and coupling the resulting product into an aryl coupling component of the type above-noted.

Among suitable coupling components are (a) phenol; α-naphthol and β-naphthol derivatives which may be substituted by up to two sulfo, carboxy, nitro, chloro, bromo or lower alkyl radicals, and (b) aniline aminonaphthalene derivatives which may be ring-substituted by up to two substituents, such as lower alkyl, chloro, bromo, sulfo, carboxy or amino radicals as above defined.

Diazotization may be accomplished with techniques conventionally employed in the preparation of azo dyestuffs. The diazotization product can then be coupled with the coupling component dissolved in an aqueous base, such as sodium hydroxide. The resulting dyestuff can be recovered and purified by conventional means.

Dyestuffs provided by the present invention can be employed to dye either natural or synthetic polymeric materials. Among the natural fibers which can be dyed are wool and silk. Within the class of dyestuffs described above, those having acidic groups are most suitable for this purpose. Among the synthetic polymeric materials which can be dyed by the present invention are polyesters, polyacrylonitriles, and superpolyamides of the type conventionally employed in textiles. Additionally, it has been found that these dyestuffs can be employed in dyeing polyolefins such as polypropylene. The dyestuffs most suitable for application to the synthetic polymeric materials are those having no acidic groups.

The following examples are presented to further illustrate the present invention.

EXAMPLE 1

3-(o-aminophenylthio)propionitrile

A mixture is prepared from 12.5 parts of orthomercaptoaniline and 10.6 parts of acrylonitrile. Neither a diluent nor a catalyst is added. Within a few minutes the reaction becomes exothermic. It is allowed to stand overnight and then is distilled. The product is obtained in the fraction boiling at 129–132° C. under a pressure of 0.12 mm. and crystallizes on standing at room temperature.

EXAMPLE 2

3-(o-aminophenylthio)propionitrile

The procedure of Example 1 is repeated except that the aniline derivative is premixed with 1 ml. of glacial acetic acid prior to the addition of acrylonitrile. No exotherm is noted. The mixture is heated at reflux for two hours, allowed to stand at room temperature for three days, and then distilled at 0.2 mm. Hg.

The free base is obtained from the fraction boiling at 147–150° C.

EXAMPLE 3

3-(4-methyl-2-aminophenylthio)propionitrile

The procedure of Example 1 is repeated except for the substitution of 4-methyl-2-mercaptoaniline, for the aniline used therein. The reaction mixture yields the product, is in Example 1.

EXAMPLE 4

*3-(4-chloro-2-aminophenylthio)propionitrile*

The product of this example is obtained by following the procedure of Example 1 except for the substitution of 4-chloro-2-mercaptoaniline for the aniline used therein.

EXAMPLE 5

*3-(4-nitro-2-aminophenylthio)propionitrile*

Following the procedure of Example 1 except for the substitution of 4-nitro-2-mercaptoaniline for the aniline used therein, the product is obtained in a like manner.

EXAMPLE 6

*3-(4-propyl-2-aminophenylthio)propionitrile*

The product is obtained by following the procedure of Example 1 identically, except for the substitution of an equivalent amount of 4-propyl-2-mercaptoaniline for the aniline compound used therein.

EXAMPLE 7

*3-(3,4-dichloro-2-aminophenylthio)propionitrile*

The product of this example is obtained by the procedure of Example 1, using in place of aniline, 3,4-dichloro-2-mercaptoaniline.

EXAMPLE 8

*3-(4-hexyl-2-aminophenylthio)propionitrile*

The product of this example is obtained by the procedure of Example 1 using as the aniline reactant, an equivalent amount of the compound 4-hexyl-2-mercaptoaniline.

EXAMPLE 9

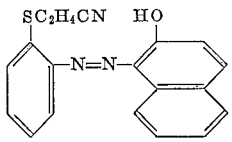

1.78 parts of the compound of Example 1 is dissolved in 40 ml. of a N/1 hydrochloric acid solution and cooled to 0° C. 10 ml. of a N/1 sodium nitrite solution is added at 0–5° C. and the mixture is stirred until completely reacted. The solution is then added dropwise to a solution of 1.44 parts of β-naphthol dissolved in 100 parts of water containing 2 parts of sodium hydroxide at 10° C. When coupling is completed, the reaction mixture is acidified to Congo red with dilute hydrochloric acid. The product is collected and dried at 60° C.

EXAMPLE 10

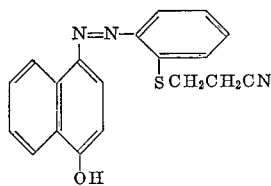

The procedure of Example 9 is followed except for the substitution of α-naphthol for the β-naphthol used therein. A reddish-orange dyestuff precipitate is obtained.

EXAMPLE 11

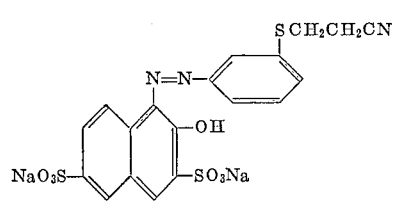

Employing the procedure of Example 9 except for the substitution of an equivalent quantity of β-naphthol-3,6-disulfonic acid disodium salt, the product is obtained as a red precipitate on addition of sodium chloride.

EXAMPLE 12

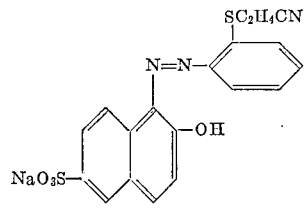

The product is obtained as a reddish-brown precipitate by substituting β-naphthol-6-sulfonic acid sodium salt for the naphthol used in Example 11 and then following the procedure therein identically.

EXAMPLE 13

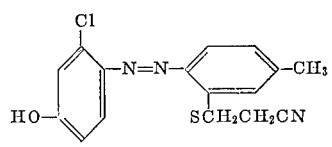

Following the procedure of Example 9 except for the substitution of 3-chlorophenol in an equivalent quantity for the naphthol used therein, the product of the above formula is obtained.

EXAMPLE 14

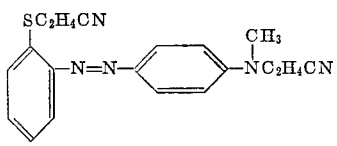

To a solution of the diazonium salt as prepared in Example 9 is added a solution of 1.6 parts of N-methyl,N-β-cyanoethyl aniline in 10 parts of glacial acetic acid. The solution is buffered to a pH of 4.5 with sodium acetate and then stirred until coupling is completed. The reddish-yellow dyestuff is collected and dried at 60° C.

Substitution of an equivalent amount of dimethylaniline in the foregoing procedure, gives the corresponding dimethylaminophenyl product.

EXAMPLE 15

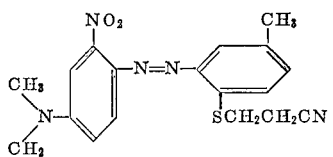

The compound of the above formula is prepared by the procedure of Example 14 except that 4-methyl-2-aminophenylthiopropionitrile is diazotized in place of the nitrile used therein; and 3-nitro-dimethylaniline is employed as the coupling component in place of the N-methyl,N-β-cyanoethylaniline used therein.

I claim:

1. A compound of the formula:

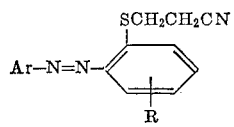

wherein Ar is the aromatic residue of a coupling compound selected from the group consisting of naphthol, sulfonaphthols, anilines and chlorophenol, and R is a member selected from the group consisting of hydrogen and lower alkyl.

2. The compound of the formula:
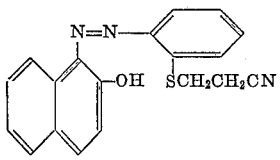
3. The compound of the formula:
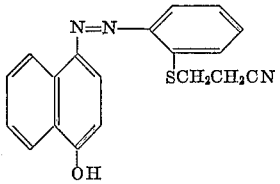
4. The compound of the formula:
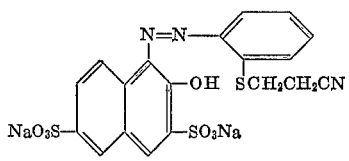
5. The compound of the formula:
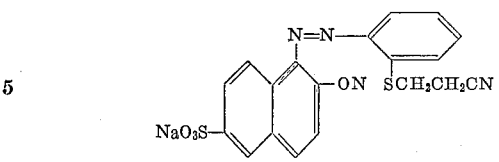
6. The compound of the formula:
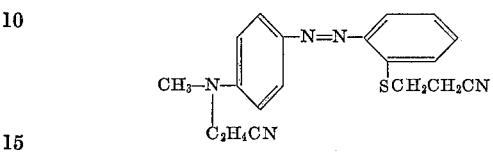
References Cited by the Examiner
UNITED STATES PATENTS
| | | | |
|---|---|---|---|
| 3,097,196 | 7/63 | Straley et al. | 260—158 |
| 995,068 | 4/10 | Herzberg et al. | 260—197 |
| 2,563,376 | 8/51 | Schenck | 260—465 |
| 2,647,113 | 7/53 | Lantz et al. | 260—197 |
| 2,809,985 | 10/57 | Buc | 260—465 |
| 2,916,482 | 12/59 | Straley et al. | 260—158 |
| 3,097,196 | 7/63 | Straley et al. | 260—158 |
FOREIGN PATENTS
352,071  3/61  Switzerland.
CHARLES B. PARKER, *Primary Examiner.*

UNITED STATES PATENT OFFICE
CERTIFICATE OF CORRECTION

Patent No. 3,211,718                                October 12, 1965

Norbert M. Bikales

It is hereby certified that error appears in the above numbered patent requiring correction and that the said Letters Patent should read as corrected below.

Column 2, line 72, for "is" read -- as --; column 4, EXAMPLE 13, the formula should appear as shown below instead of as in the patent:

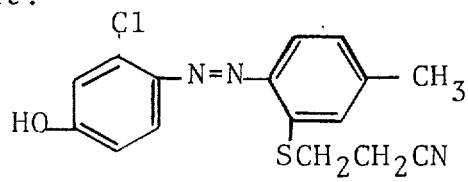

same column 4, EXAMPLE 15, the formula should appear as shown below instead of as in the patent:

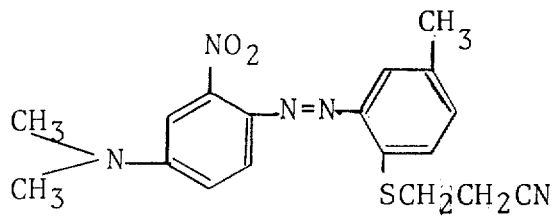

column 6, lines 2 to 8, the formula should appear as shown below instead of as in the patent:

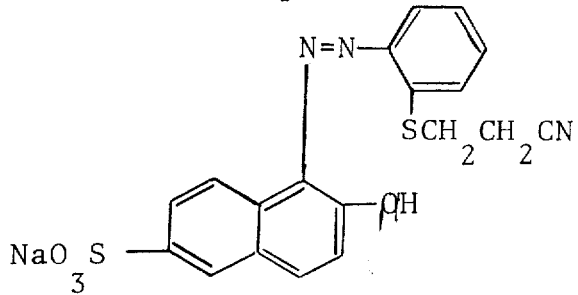

Signed and sealed this 17th day of May 1966.

(SEAL)
Attest:

ERNEST W. SWIDER                              EDWARD J. BRENNER
Attesting Officer                            Commissioner of Patents